United States Patent

[11] 3,613,939

| [72] | Inventor | Joachim Ehle<br>Essen, Germany |
|---|---|---|
| [21] | Appl. No. | 883,246 |
| [22] | Filed | Dec. 8, 1969 |
| [45] | Patented | Oct. 19, 1971 |
| [73] | Assignee | Fried Krupp Gesellschaft mit beschranter Haftung<br>Essen, Germany |
| [32] | Priority | Dec. 14, 1968 |
| [33] | | Germany |
| [31] | | P 18 14 721.2 |

[54] CLOSURE FOR HIGH-PRESSURE CONTAINER
9 Claims, 2 Drawing Figs.

[52] U.S. Cl. .................................................. 220/46
[51] Int. Cl. .................................................. B65d 53/00
[50] Field of Search .................................. 220/46, 3; 138/89

[56]     References Cited
    UNITED STATES PATENTS
2,746,486  5/1956  Gratzmuller .................  220/46 MS
3,270,906  9/1966  Christensen .................  220/46 MS

*Primary Examiner*—George T. Hall
*Attorney*—Walter Becker

ABSTRACT: A sealing arrangement for high-pressure container and pipes, in which one of the sealing surfaces of a sealing structure forms a part of the cover or the container to be sealed and extends in axial direction of said cover or container while being elastically deformable in response to the pretightening pressure exerted upon said cover and in response to the full operating pressure developed in said container.

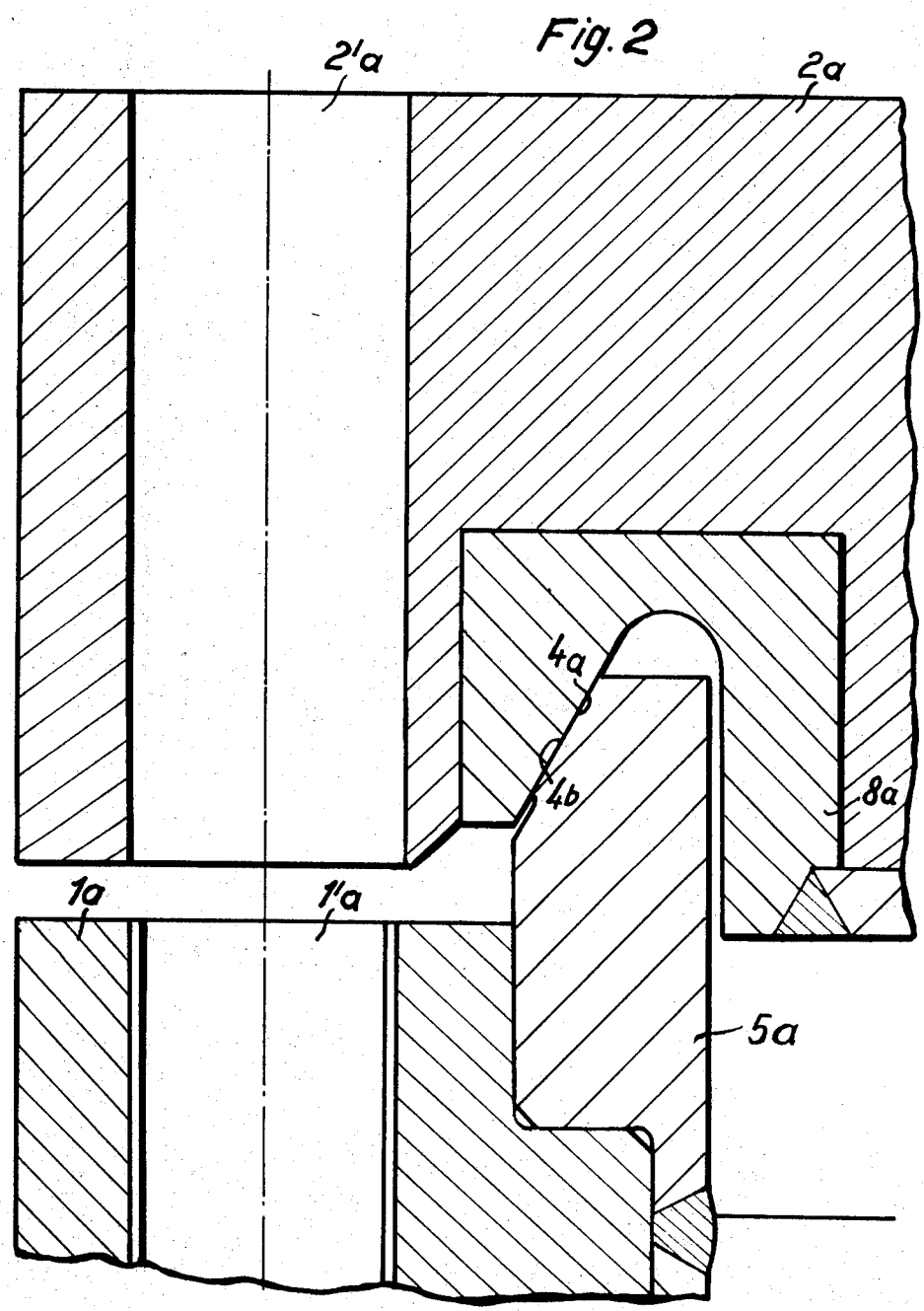

CLOSURE FOR HIGH-PRESSURE CONTAINER

The present invention relates to a closure for high-pressure containers. For high-pressure containers, such as reaction vessels, in which a very high-pressure and in most instances simultaneously also a high temperature prevails, tightly sealing closure means are a necessity. Various high-pressure closure means have heretofore become known and have generally proved satisfactory as to the sealing effect thereof. These heretofore known constructions, however, have various drawbacks. In this connection it may be mentioned that the heretofore known single-cone seal, according to which the conical sealing surface in the cover is formed by a simple annular step on the substantially plane inner side of the cover, has to be subjected to a high preload in order to properly seal so that the corresponding upper marginal area of the respective container has to have an unduly great accumulation of material to assure the proper strength. With regard to other heretofore known closure means, loose rings of double conical or wedge-shaped cross section are provided for sealing purposes. The precise machining of such loose sealing rings requires a number of tools and machines and also requires highly skilled workmen so that the costs of producing such closure means are relatively high. Moreover, such loose sealing rings, when taken off the work bench and during their transport as well as during the assembly work, are apt to become oval or deformed so that a proper seal is sometimes questionable.

It is, therefore, an object of the present invention to provide a closure means for the cover of high-pressure containers and high-pressure pipes, which will overcome the above mentioned drawbacks and will permit an easier assembly.

This object and other objects and advantages of the invention will appear more clearly from the following specification in connection with the accompanying drawing, in which:

FIG. 2 shows a section similar to that of FIG. 1, with the sealing ring forming a part of the container.

Figure 1:
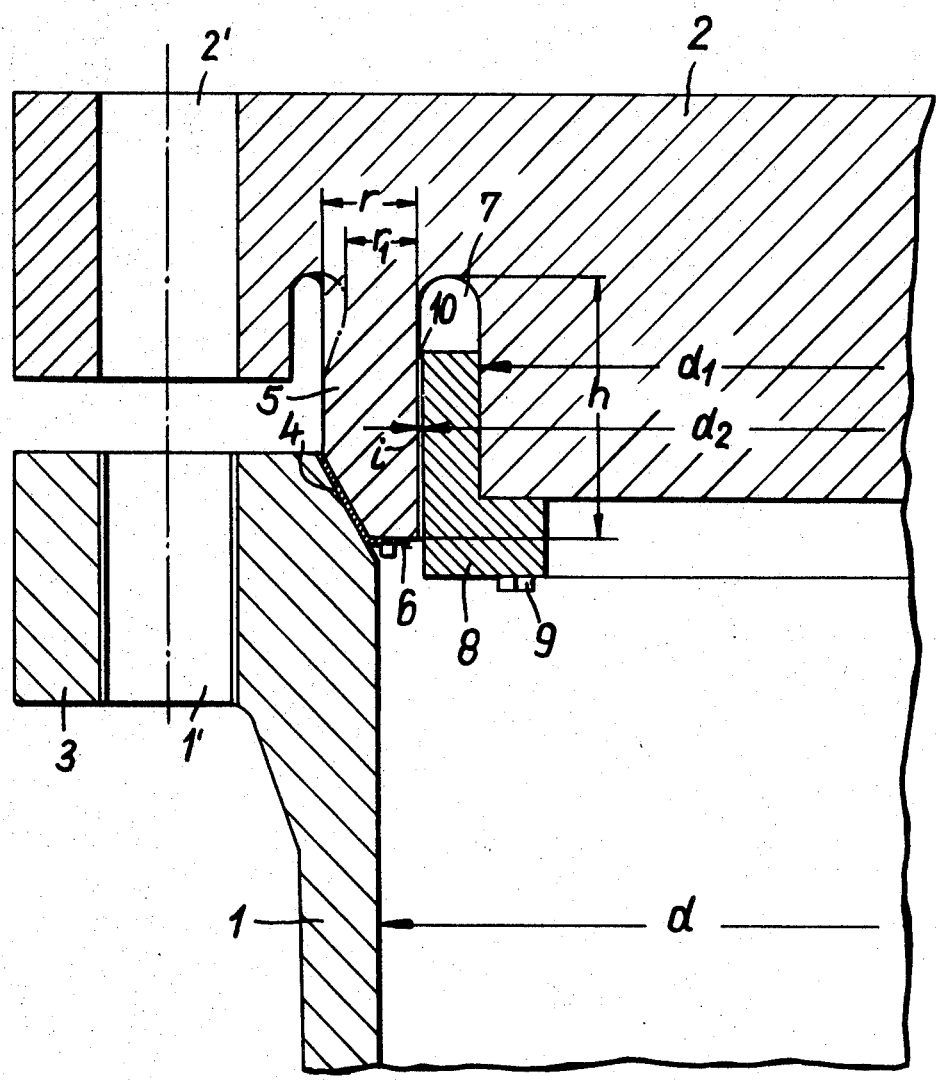
FIG. 1 shows in section a portion of a closure arrangement according to the invention with the sealing ring forming part of the cover.

The closure structure according to the present invention is characterized primarily in that one of the sealing surfaces pertaining to the sealing means between the container and the cover therefor is arranged on a sealing ring which in the manner of a tongue extends in axial direction of the cover and forms a part either of the cover or the container, the cover being adapted, when being placed under a preload and also when the pressure in the container acts thereupon and reaches full operating pressure, to be elastically deformed.

The tongue-shaped sealing ring can be machined in a considerably simpler manner than a loose ring because, due to the fact that the ring forms a part of the cover or the container, it can be machined simultaneously with the cover when the cover is being machined on the work bench. Such tongue-shaped sealing ring cannot distort or deform during the transport of the cover or the vessel or during the assembly work. As a matter of fact, such sealing ring can also always easily be machined inasmuch as it remains centrally arranged with regard to the cover and container respectively.

According to a further development of the invention, an annular groove is provided in the cover with the tongue-shaped sealing ring forming a part of the cover. Within this annular groove there is detachably arranged a guiding ring which limits the elastic deformation of the sealing ring when the cover is being placed under preload.

Customarily, the tongue-shaped sealing ring is worked out of the cover material by machining two annular grooves into the inner side of the cover within and outside of the sealing ring. If the inner side of the cover should be provided with a lining of a corrosion-resistant material, as it is necessary in special instances, the sealing ring may consist of the lining material and may be tightly connected to the cover, for instance, by welding and may subsequently be machined in a normal manner.

Referring now to drawing in detail, the cylindrical high-pressure container 1 shown therein has an inner diameter $d$ and is closed by a cover 2 which latter is connected to the flange 3 by means of bolts not shown extending through the bores 1' and 2'. Of the conical sealing surfaces 4 between the cover and the inner wall of the container 1, that sealing surface 4 which is on the side of the cover is arranged at the root of the sealing ring 5 having the height $h$ and the thickness $r$ (or $r_1$ with a design indicated by dot-dash lines). The sealing ring 5 forms a part of the cover and extends in the manner of a tongue in axial direction. Between the two sealing surfaces 4 there is placed a foil 6 of soft metal, such as copper or aluminum, which foil plastically deforms when tightening the connecting bolts extending through the bores 1a and 1b but not being shown in the drawing.

Directly adjacent the inside of the sealing ring 5 and in the cover 2 there is an annular groove 7 in which a guiding ring 8 having an inner diameter $d_1$ and an outer diameter $d_2$ is by means of holding screws 9 detachably mounted in such a way that between said guiding ring 8 and the sealing ring 5 there remains an annular gap 10 having the width $i$.

When preloading the cover, the tongue-shaped sealing ring 5 may elastically deform until the annular gap 10 is closed which means that the sealing ring 5 rests against the guiding ring 8. The stresses to which the sealing ring 5 is subjected in this connection may be held within permissible limits by a suitable selection of the values $i$, $h$, and $r$ ($r_1$).

The arrangement of FIG. 2 substantially corresponds to that of FIG. 1 with the exception that the sealing ring 5a forms part of or is connected to the container 1a instead of being a part of the cover as shown in FIG. 1. The elements of FIG. 2 which correspond to those of FIG. 1 have been designated in FIG. 2 with the same reference numerals as in FIG. 1 but with the additional character $a$. It may also be mentioned that, if desired, a foil similar to foil 6 of FIG. 1, may be inserted between the surfaces 4a and 4b.

According to a further feature of the invention, the sealing ring 5a and/or insert member 8a may consist of corrosion-resistant material or may be provided with a corrosion-resistant plating.

It is, of course, to be understood that the present invention is, by no means, limited to the particular showing in the drawing but also comprises any modifications within the scope of the appended claims.

What I claim is:

1. A sealing arrangement for containers and pipes, which includes: a first member adapted to receive fluid under pressure and provided with an opening having a first conical surface, a second member forming a cover for said first member and having a second conical surface for cooperation with said first conical surface to close said opening, and a sealing ring forming one of said first and second conical surfaces while being a part of one of said first and second members and extending in the axial direction of said one member toward the other member, said sealing ring being elastically deformable in response to said two members being connected to each other while being subjected to a pressure varying from a preload for tightly connecting said two members to each other to a full operating pressure in said first member.

2. An arrangement according to claim 1, in which said sealing ring forms a part of said cover.

3. An arrangement according to claim 2, in which said sealing ring and said cover consist of one single integral piece.

4. An arrangement according to claim 1, in which said sealing ring forms a part of said first member.

5. An arrangement according to claim 4, in which said sealing ring is welded to said first member.

6. An arrangement according to claim 1, which includes an insert member welded to said cover and forming said second conical surface.

7. An arrangement according to claim 1, which includes annular guiding means detachably inserted in said cover and arranged in radially inwardly slightly spaced relationship to said sealing ring for limiting the elastic deformation of the latter.

8. An arrangement according to claim 1, which includes a deformable metal foil interposed between said first and second conical surfaces.

9. An arrangement according to claim 1, in which said sealing ring consists of a corrosion-resistant material.